(12) United States Patent  
Adames

(10) Patent No.: US 9,800,074 B2  
(45) Date of Patent: Oct. 24, 2017

(54) PORTABLE BATTERY CHARGER

(71) Applicant: Fernando Emilio Adames, Santo Domingo (DO)

(72) Inventor: Fernando Emilio Adames, Santo Domingo (DO)

(*) Notice: Subject to any disclaimer, the term of this patent is extended or adjusted under 35 U.S.C. 154(b) by 949 days.

(21) Appl. No.: 13/956,701

(22) Filed: Aug. 1, 2013

(65) Prior Publication Data

US 2013/0320919 A1 Dec. 5, 2013

Related U.S. Application Data

(63) Continuation-in-part of application No. 12/867,310, filed as application No. PCT/DO2008/000001 on Feb. 14, 2008, now abandoned.

(51) Int. Cl.
| | |
|---|---|
| *H02J 7/00* | (2006.01) |
| *H02J 7/35* | (2006.01) |
| *H01M 10/44* | (2006.01) |
| *H01M 10/48* | (2006.01) |

(52) U.S. Cl.
CPC ............ *H02J 7/007* (2013.01); *H01M 10/441* (2013.01); *H01M 10/482* (2013.01); *H02J 7/0013* (2013.01); *H02J 7/0042* (2013.01); *H02J 7/0054* (2013.01); *H02J 7/0055* (2013.01); *H02J 7/35* (2013.01)

(58) Field of Classification Search
CPC ....... H02J 7/0042; H02J 7/0014; H02J 7/0019
USPC ................................ 320/107, 116, 118, 122
See application file for complete search history.

(56) References Cited

U.S. PATENT DOCUMENTS

| | | | | |
|---|---|---|---|---|
| 3,576,485 A | * | 4/1971 | Coons, Jr. ............ | H02H 7/0844 318/434 |
| 5,200,877 A | * | 4/1993 | Betton ................... | H02J 9/002 307/10.7 |
| 6,437,543 B1 | * | 8/2002 | Oler ...................... | H01M 10/46 320/150 |
| 6,867,568 B1 | * | 3/2005 | Olson ................... | H02J 7/0073 320/137 |
| 2006/0012334 A1 | * | 1/2006 | Watson ................ | B60L 3/0046 320/112 |

* cited by examiner

*Primary Examiner* — Nathaniel Pelton  
*Assistant Examiner* — Johali Torres Ruiz  
(74) *Attorney, Agent, or Firm* — Hector M. Reyes Rivera

(57) ABSTRACT

A portable device for charging and discharging batteries simultaneously via having a servomotor controlled automatically by a microcontroller unit using a software is described. The servomotor arm is controlled and a circuit is open or closed at the command of the software based upon the voltage of each one of the batteries connected to the device; the temperature of electrical wires of the circuit and the amperage of the battery or batteries being charged. A second device for charging/discharging batteries is described having a servomotor arm controlled automatically by a microcontroller unit using a software. The servomotor arm is controlled during the charging/discharging process, which is carried out in two independent circuits in an alternated manner by moving the servomotor arm from one circuit to another based upon the same mentioned parameters. The charging/discharging process in both devices is also automatically stopped and continues at a predetermined periods of time by the microcontroller via a software.

16 Claims, 17 Drawing Sheets

PORTABLE BATTERY CHARGER

CROSS REFERENCE TO RELATED APPLICATIONS

This application is a continuation-in-part of non-provisional application Ser. No. 12/867,310 filed on Oct. 20, 2010, now abandoned, which is the National Stage of International Application No. PCT/DO2008/000001 filed on Feb. 14, 2008. Each patent application identified above is incorporated here by reference in its entirety to provide continuity of disclosure.

FIELD OF THE INVENTION

The instant invention is directed to a device useful in charging and discharging batteries. More particularly, the invention is directed to a portable battery charger capable of charging and discharging batteries very fast without energy losses and capable of protecting and extending the useful life of batteries.

BACKGROUND OF THE INVENTION

Nowadays, energy obtained from fossil fuel, biomass (mainly wood combustion), nuclear energy and hydraulic energy covers worldwide energetic demand in more than 98%, being the fossil fuels used the most since the latter represents 75% of the energy production in the world.

Current energy problems that the World is facing is mainly caused by an increase in the consumption and the known exhaustion of the non-renewable energetic resources like fossil fuels, particularly hydrocarbons, which have been used for energy generation over the years, and it is expected to get totally exhausted within the next 50 or 60 years. It has provoked an increase in the price of oil and oil derivative products never seen before what makes countries to invest large amounts of money for paying their oil invoices.

On the other hand, some investigations have been achieved regarding the use of other alternative energy sources like wind power, solar energy, hydro-electric power, ocean wave energy, or the energy coming from biomass; but they are not efficient due to some factors like limitations in the energy production, technological and implementation costs, and some others of different kinds. Studies have revealed that just 23% of global energy production is out of alternative sources of energy as a consequence of listed limitations. Then, being hydrocarbons the main source to produce energy, their use or exploitation is not efficient since 60-70% of their potentialities are wasted in the energy generation process.

An approach to improve this situation has resulted in the use of inverters; however, this technology has a disadvantage and it is that inverters increase many times the energy consumption in the battery charging process. Energy, due to its own nature, cannot be stored in large amounts or to a large scale, factor that emphasizes the limitation of conventional batteries in the storing process for further use. Other negative aspect regarding inverters is that the useful life of batteries is limited and it is shortened by the conversion process when used associated to inverters.

In the state of the art it is well known inverters are devices that transform alternating current (AC) taken from different input sources into direct current (DC) to convert this energy into stored or potential energy. This stored energy can be used before an alternating current demand since inverters transform stored energy (DC) from batteries into alternating current (AC). There is a considerable energy leak in the process caused by conversion and it brings out negative consequences manifested in the energy consumption increment during charging process; thus, consumption multiplies since inverter's demand is added to energy demand already installed. For example, batteries conceived for providing energy during 1 hour need 2 hours of continuous charging process. During bidirectional energy conversion process (AC-DC and DC-AC) there is an energy leak associated to conversion that is translated into an increase of the consumption. Also, there is another limitation and it is related to the shortened useful life of batteries caused by panel deterioration due to current conversion process and storage time, since constant conversion energy executed by charger provokes a temperature increase what causes damages to the components of batteries and thus reduces the useful life of batteries.

One of the best known applications of inverters is transforming alternating current (AC) from the conventional power supply grid into direct current (DC) to transform it again into alternating current (AC) to provide energy during a black out caused by generation shortfall or damages. In this case inverters are electrical backups providing a limited energy supply regarding the current it can generate and time. However, inverters have started to be used associated to other energy sources like cells, solar panels, wind power generators, and the like; which are alternating current (AC) suppliers, it goes through the conversion process previously described with the characteristics and limitations already mentioned and the inconvenience that not all the energy generated by those devices is used, since the unused energy cannot be stored but it is dissipated.

In relation to battery chargers or battery banks, it is known in the state of the art the patent JP2003299256, publication date 2003 Oct. 17, whose applicant is NTT DATA CORP, which claims an energy charger/discharger that has no leaks during battery charging/discharging process. However, it has an important inconvenience because it does not possess sensor to determine such important parameters like temperature in batteries. Temperature increases due to charging/discharging process what is translated into a reduction of useful life of batteries caused by the action of energy on panels. Also the lack of sensors forbid determining the exact level of energy existing in batteries, added to the fact that the discharging process is slow and there is no counter for the energy flow supplied to batteries.

Similar to the previous one is U.S. Pat. No. 5,396,163, whose applicant is Inco Limited and Norvik Technologies, Inc., which claims a charger for batteries and its main advantage is not having resistance to current what reduces the leak caused by resistance, and also it monitors the charging state to avoid overcharging of batteries. In this case inverters are electrical backups providing a limited supply regarding the current it can generate and time. However, inverters have started to be used associated to other energy sources like cells, solar panels, wind power generators, etc, which are alternating current (AC) supplier, it goes through the conversion process previously described with the characteristics and limitation already mentioned and the inconvenience that not all the energy generated by those devices is used, since the unused energy cannot be stored but it is dissipated.

In relation to battery chargers or battery banks it is known in the state of the art the patent JP 2003299256, publication date 2003 Oct. 17, whose applicant is NTT DATA CORP, which claims an energy charger/discharger that has no leak during the battery changing/discharging process. However, it has an important inconvenience because it does not possess sensor to determine such important parameters like temperature in batteries. Temperature increase due to the charging/discharging process what is translated into a reduction of useful life of battery caused by action of energy on panels. Also the lack of sensors forbid determining the exact levels of energy existing in batteries, added to the fact that the discharging process is slow and there is no counter for the energy flow supplied to batteries.

Similar to the previous U.S. Pat. No. 5,396,163, whose applicant is Inco Limited and Norvik Technologies, Inc., which claims a charger for batteries and its main advantage is the no resistance to current what reduces the leak caused by resistance, and also it monitors the changing state to avoid overcharging of batteries. Nevertheless, it has an important disadvantage: it is unidirectional charger that has no sensor to monitor temperate in batteries, besides it is a charger to be operated with a low energy flow.

U.S. Pat. No. 6,222,343, issued Apr. 24, 2014, whose applicant is Milwaukee Electric Tool Corporation, claims a battery charger, a method for charging and software. Its main disadvantage: from an AC source the charger is limited to the demanded energy flow, conversion leak is increased, if the energy flow is higher than the amperage tolerated by the switch, then the charger cannot function. Also the charger has no counter for energy supplied to the batteries and it is not designed to monitor the energy supplied to batteries. In addition to these points, it functions only in one direction.

Other solution to battery chargers is presented by U.S. Pat. No. 4,638,236, issued Jan. 20, 1987, whose applicant is BUSCH & CO INC AG. This patent claims a battery charger that functions with energy available in an electrical lighter of the kind of vehicles. This invention has some disadvantages: a) it is a charger that uses a low energy flow (low amperage), b) a rectifier is needed what makes charging to be slow and to have energy leak during the charging process, c) it is not a bidirectional charger, d) it does not have a counter of supplied current flow, e) charging process parameters are not monitored, f) the local vehicle battery can be discharged if it does not receive a charge from alternator when the local battery is been drained.

In the state of the art it is also known the U.S. Pat. No. 4,843,251, issued on Jun. 2, 1989, whose applicant is MCSORLEY SR HARRY J. This patent claims a system to charge batteries or bank of batteries which has a main disadvantage: energy leak occurs during the energy conversion process, when energy is stored and at the moment of being delivered. Hence, energy leak duplicates. In addition, there is no monitoring of temperature what brings out the risk of panel overheating, considerably reducing their useful life. Also this is not a bidirectional charger.

It is also known in the state of the art that wind power, or solar energy are used for charging batteries, and an inverter is used to transform produced energy or alternating current (AC) into direct current (DC/CC) to be stored in batteries. An example of such kind of technology is offered in U.S. Pat. No. 5,111,127, issued May 5, 1992, whose main applicant is JOHNSON WOODWARD. Said patent claims a portable power supply having a rechargeable battery, and an inverter/converter unit for conversion of DC power to AC power and vice versa. Photovoltaic panels are mounted to the frame for recharging the battery. It is easy to handle this device since it is a portable one, but it has a main inconvenience: once the battery is exhausted it cannot be recharged again until panels receive sufficient light intensity as to generate needed energy to satisfy battery demands. On the other hand, the dependence of energy provided by photovoltaic panels limits the device regarding its use since it does not function with energy from other sources; also much time is required to recharge battery, in addition to the fact that part of the energy received in photovoltaic panels is not used when associated battery is totally charged and there is no storage capacity.

Technology incorporated to hybrid vehicles, electric current, can be obtained from the conventional supplier or self-generated. It tends to decrease the hydrocarbons consumption.

Japanese Patent No. 10271694, published Oct. 9, 1998, whose applicant is NISSAN MOTOR, claims an inverter/charger device using alternating current (AC) to charge batteries, and at the same time it monitors energy levels and temperature of an auxiliary battery in an electric car. This device allows charging auxiliary batteries and draining energy from a terminal, but it has the inconvenience that it is not a bidirectional one; that is to say, it works in only one way during the charging/discharging process of the energy coming from the auxiliary battery. Then an auxiliary output is required for drained energy. Also, the energy flow supplied by the battery is a maintenance flow of energy levels what makes the charging process to be slow. In addition to this, the discharging of the battery to the terminal is a slow process what causes the system to be inefficient.

It is widely known that energetic problem, particularly everything related to hydrocarbons, is a priority to be solved.

SUMMARY OF THE INVENTION

It is an object of the instant invention to provide a portable device useful in charging/discharging batteries simultaneously. Another object of the invention is to provide a battery charging/discharging or energy transferring device able to preserve the components of the batteries being charged and discharge by avoiding overheating and overcharging during the charging/discharging or energy transferring process. It is another object of the invention to provide a charging/discharging device that may charge multiple batteries simultaneously. Yet another object of the invention is to provide a charging/discharging batteries device highly efficient by having two energy transferring circuits that are able to charge/discharge batteries in an independent and alternate manner while avoiding overheating and overcharging of the batteries In yet another object of the invention is to provide a batteries charging/discharging device that allows charging batteries using direct current or alternate current.

These and other objectives have been achieved in accordance with the instant invention by providing a portable device, useful in charging and discharging batteries simultaneously, said device comprising a housing having a permanent internal supporting area; a microcontroller having multiple peripheral ports; which is programmed or associated with a software that is able to control the charging/discharging energy process or energy transferring process; a charging port configured to receive energy from an external power supply, said charging port being electrically connected to the microcontroller; a power supply regulator being electrically connected to said microcontroller unit; a servomotor, electrically coupled to said microcontroller and electrically powered from said power supply regulator via said microcontroller; said servomotor connected to a rotatory servomotor arm having multiple metallic conducting plates; multiple electric wires, each of said wires having an internal end and an external end, each one of said external ends being coupled to a battery terminal connector; a set of aligned metallic plates permanently connected to the internal supporting area, each of said plates permanently connected to one of said internal end of said electrical wires; means for sensing, detecting and communicating to the programmed microcontroller: (1) the position of said mechanical arms; (2) the voltage of each one of the batteries connected to the device; (3) means for sensing and detecting the temperature of the electrical wires and the amperage of the battery o batteries being charged and wherein an electric circuit for charging/discharging batteries or energy transfer process is completed or closed by positioning said servomotor arm over said aligned metallic plates and connecting said battery terminal connectors on the batteries terminal, thus allowing the transferring of electric charge and wherein the position of said servomotor is controlled by the microcontroller based upon the data received from the means for sensing, detecting and communicating to the microcontroller the position of said mechanical arm, the voltage of each one of the batteries connected to the device, the temperature of the electrical wires and the amperage of the battery o batteries being charged. Similarly, in a second embodiment of the instant invention, said objectives are also achieved in accordance with the instant invention by providing a dual circuit portable device, useful in charging and discharging two sets of batteries in an alternate process, said device comprising a housing having a permanent internal flat supporting area; a microcontroller, which comprises a microcontroller having multiple peripheral ports and that is programmed or associated with a software that is able to control the energy transfer or charging/discharging process; a charging port configured to receive energy from an external power supply, said charging port being electrically connected to the microcontroller unit; a power supply regulator being electrically connected to said microcontroller unit; a servomotor, electrically coupled to said microcontroller unit and electrically powered from said power supply regulator via said microcontroller; said servomotor connected to a rotatory servomotor arm connected to a first set of multiple metallic conducting plates; a first set of multiple electric wires, each of said wires having an internal end and an external end in reference to its position regarding the housing, said external end being coupled to a battery terminal connector; a second set of multiple electric wires, each of said wires having an internal end and an external end, said external end being coupled to a battery terminal connector; a second set of aligned metallic plates permanently connected to the internal supporting area, each one of said plates permanently connected to one of said internal end of the first set of said electrical wires; a third set of aligned metallic plates permanently connected to the internal supporting flat area, each one of said plates permanently connected to one of said internal end of the second set of said electrical wires; means for sensing, detecting and communicating to microcontroller (1) the position of said mechanical arms, (2) the voltage of each one of the batteries connected to the device (3) the temperature of the first set of electrical wires; (4) the temperature of the second set of electrical wires; (5) the amperage of the battery o batteries being charged using the first set of electrical wires; (6) the amperage of the battery o batteries being charged using the second set of electrical wires and wherein two independent electric circuits for energy transferring process or charging/discharging of batteries are constituted: a first circuit which is closed by positioning or shifting said servomotor arm over said second aligned metallic plates and said battery terminal connectors of the first set of batteries on the batteries terminals and a second circuit, which is closed by positioning or shifting said servomotor arm over said third aligned metallic plates and said battery terminal connectors of the second set of batteries on the batteries terminals and wherein the position of said servomotor is controlled by the microcontroller unit, based upon the data received from the means for sensing, detecting and communicating to the main micro-controller the position of said mechanical arm, the voltage of each one of the batteries connected to the device, the temperature of the first set of electrical wires; the temperature of the second set of electrical wires; the amperage of the battery or batteries being charged using the first set of electrical wires and the amperage of the battery batteries being charged using the second set of electrical wires and wherein said two independent circuits charge/discharge batteries or transfer energy in an alternated mode.

BRIEF DESCRIPTION OF THE DRAWINGS

The nature and objects of the present invention and its advantages will be more clearly and easily understood after reading the following non-restricted description of preferred embodiments thereof, made with reference to the following drawings, in which.

DETAILED DESCRIPTION OF THE INVENTION

The present invention will now be described more fully hereinafter with reference to the accompanying drawing, in which preferred embodiments of the invention are illustrated. The invention may, however, be embodied in very different forms and should not be construed as limited to the embodiments set forth herein. Rather, these embodiments are provided as examples and should not be interpreted as limiting since such embodiments are presented as a basis for the claims and with the main objective of teaching those skilled in the art to make and use the invention, in a manner that, this application will be thorough and complete, and will fully convey the true scope of the invention to those skilled in the art.

The present invention is directed to a portable charger/discharger of DC/DC power that allows the transfer of electric charge from a battery or a set of batteries to another battery or set of batteries is a fast manner. The device also allows the transfer of electric charge from an AC source to a battery or a set of batteries (AC/DC), allowing for charging batteries with electric charge from an AC power source, wherein the current is previously subjected to a process of rectification. The device or charger is portable, but it may be used in a stationary manner at the will of the user. Such a transfer of electrical charge is carried out in a quick and efficient process where the energy loss is reduced and the internal structure of the battery or batteries in the charging/discharging process are protected.

Herein two preferred embodiments of the invention are detailed described, in order to show the skilled in the art how to make and use the invention. However, it should be known that the present description does not limit the concept of invention since potential changes of the description described herein providing other potential embodiments are within the scope or the spirit of the invention.

Figure 1:
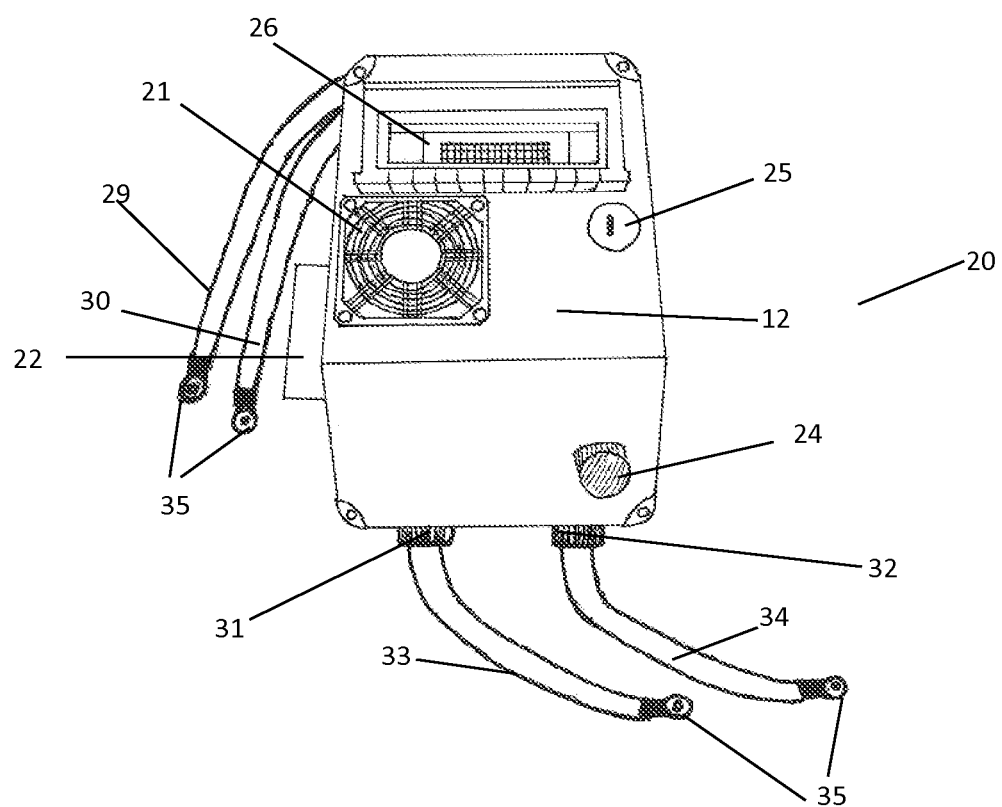
FIGS. 1-3 show front, lateral and back views of the first preferred embodiment according to the invention.
Figure 2:
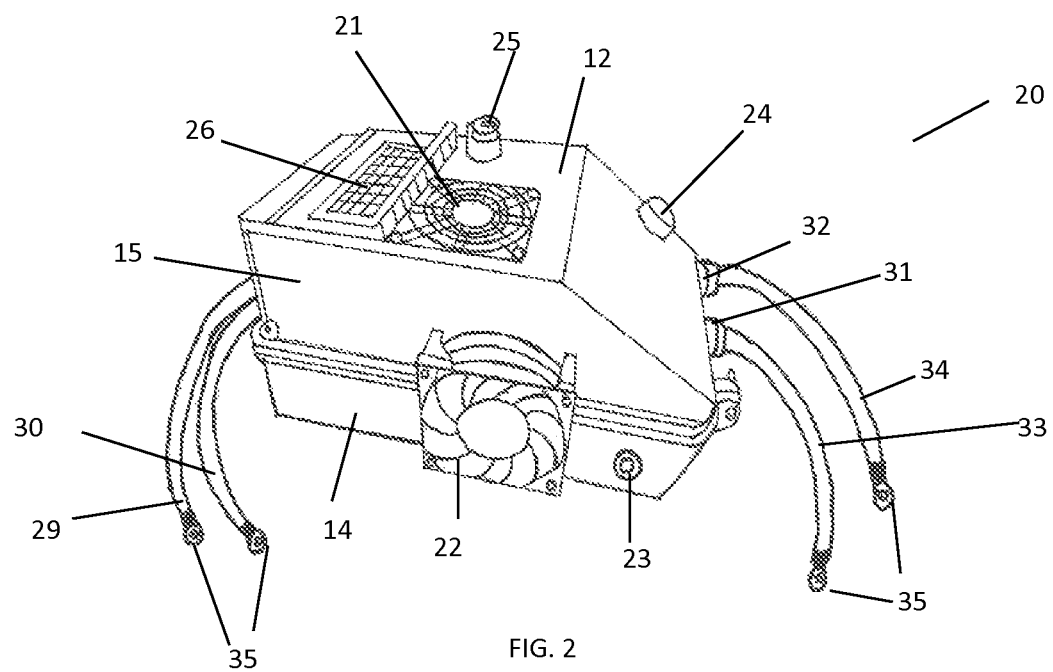
Figure 3:
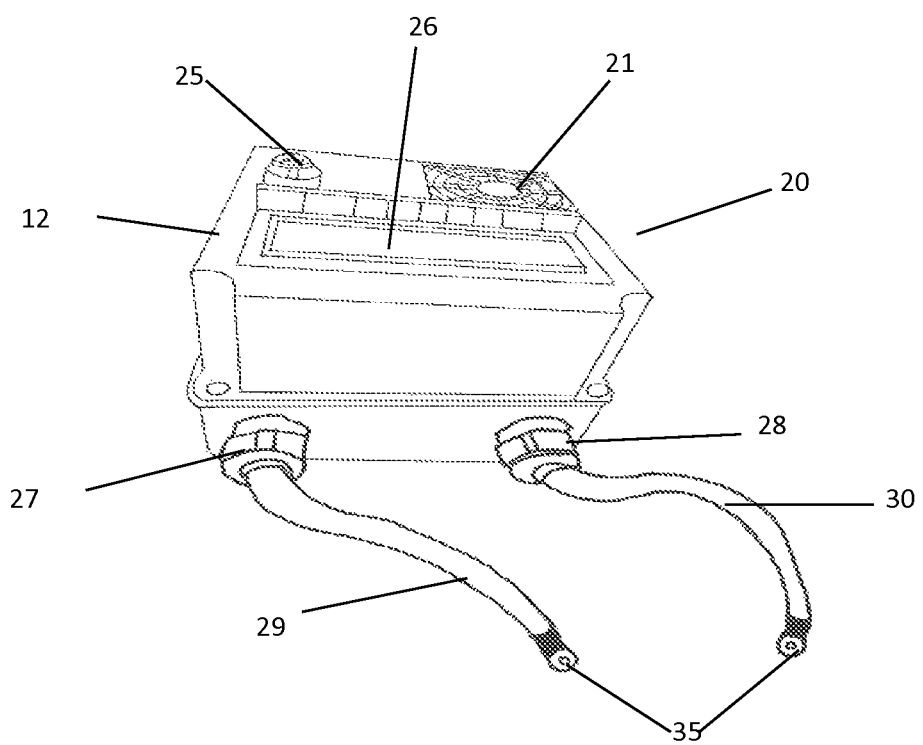
Figure 4:
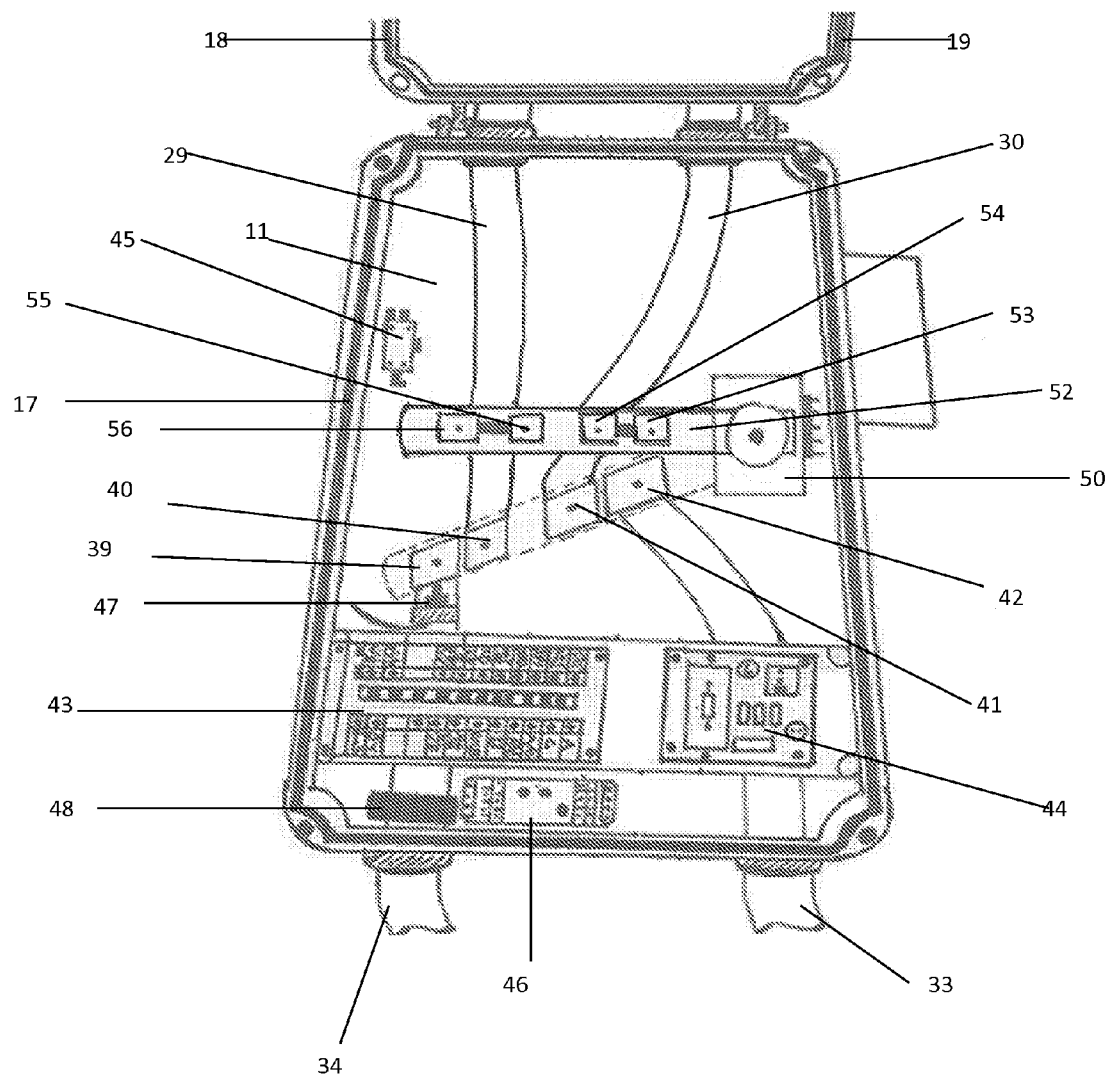
FIG. 4 shows a top view of interior section of the first preferred embodiment according to the invention illustrating its internal parts and the preferred manner to distribute or position such internal parts and wherein the electrical wires and the top section of the case has been cut off for clarity.

The first preferred embodiment of the invention 20 is illustrated in FIGS. 1-3, wherein the external parts of the device are shown front, lateral, and rear views, respectively. On the other hand, FIG. 4 illustrates schematically a partial top view of the interior of embodiment 20 according to the invention, wherein the required internal parts of the device are shown and the preferred manner in which such parts are distributed are illustrated. More specifically, FIGS. 1-3 illustrate external parts of the first embodiment according to the invention. As it is illustrated in FIG. 1-3, embodiment 20 comprises housing or case 12, which comprises a lower section or base 14 and an upper section or cover 15. Such sections 14 and 15 are joined by hinges or any other similar and suitable fastening means. Sections 14 and 15 also comprises slots 17 and 18, such as shown in FIG. 4, located near the periphery of the edges of the case 12. Rubber gasket 19, inserted in slots 17 and 18 allows the sealing of housing 12 whenever the sections 14 and 15 are in the closed position. It should be understood that any other suitable housing or case may be used in order to contain and protect the components of the devices described in the instant description.

The instant device comprises a cooling system that includes, as illustrated in FIG. 2, fan 21 and exhaust unit 22. Embodiment 20 also comprises charging port 23, which is configured to be loaded from an external source so that the charger can be electrically powered. Similarly, as it is illustrated in FIG. 2, embodiment 20 also comprises ignition switch ON/OF 24, and push switch 25. Similarly, as it is illustrated in FIG. 2, preferred embodiment 20 also includes display unit 26, preferably TEX/BAR-GRAPH PLED DISPLAY model or a like, at the exterior top section of housing 12.

Figure 5:
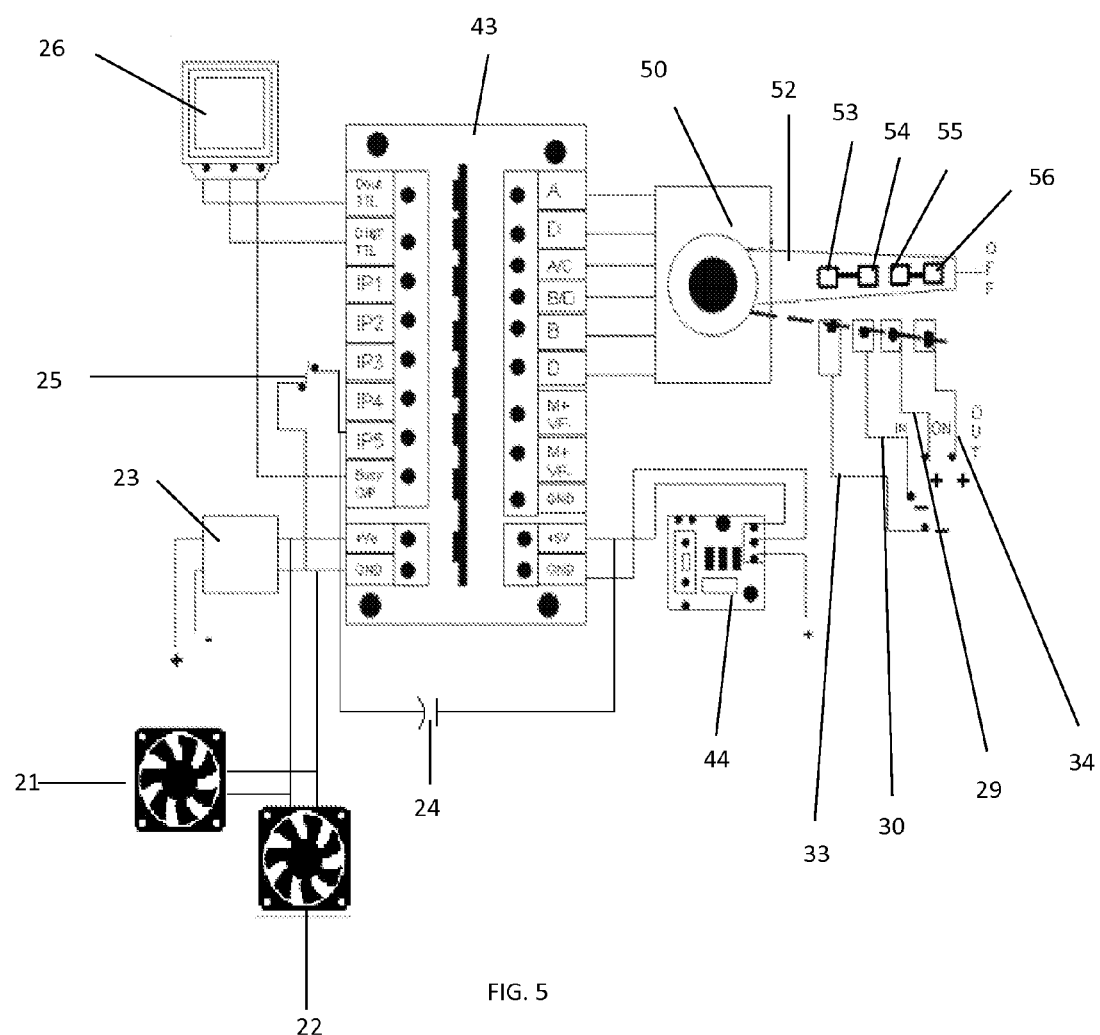
FIG. 5 shows a diagram of the internal parts of the first embodiment according to the invention.
Figure 6A:
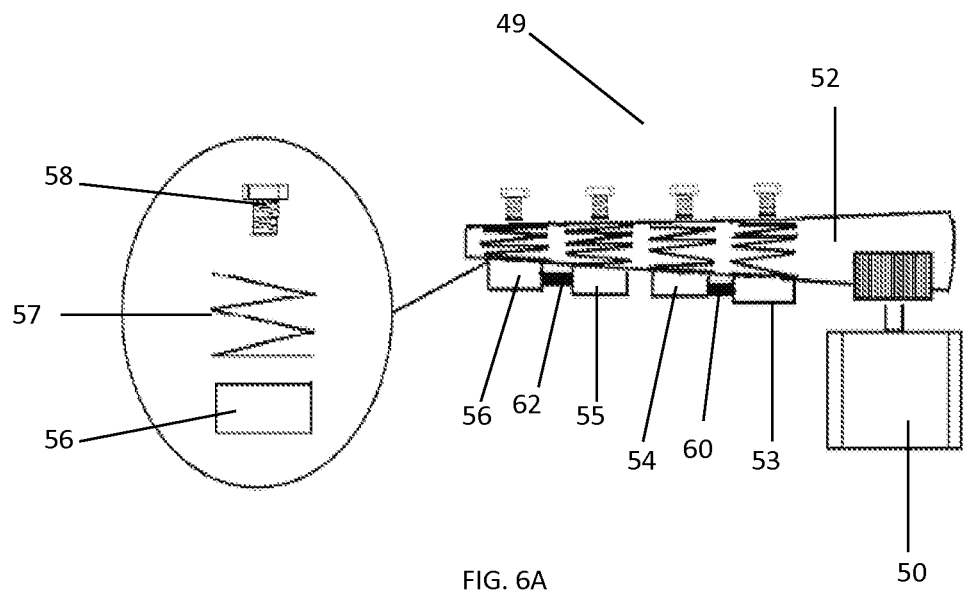
FIG. 6A shows lateral view of the servomotor and its mechanical arm; wherein the external surface of said arm is omitted in order to show internal components of the arm and a detailed view of the components of the servomotor arm.
Figure 6B:
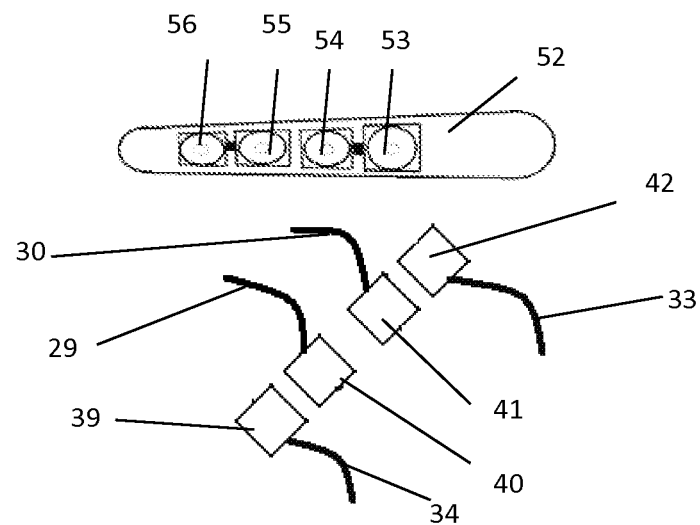
FIG. 6B illustrates a top view of the servomotor arm, showing its two pair of interconnected plates, the internal ends of the electrical wires and its metal plates and the relative position of the plates connecting internal ends of the electrical wires with respect to the plates on the servomotor arm.

As is illustrated in FIGS. 1, 2 and 3, preferred embodiment 20 also comprises holes 27 and 28 located in the back section of housing 12, from where electric wiring or cables 29 and 30, the first positive and the second negative are allow exit from the interior to the exterior of the device 20. In a similar manner, it also comprises holes 31 and 32 located in front of housing 12, throughout which electrical wires 33 and 34, the first negative and the second positive are coming out from the interior to the exterior of the device 20. Elongated bodies of electrical wires 29, 30, 33 and 34 have one of their ends at the exterior of the device wherein such external end comprises connection units 35, which are designed to be the point of connection of these wires with the poles or terminals of the batteries to be charged/discharged using the instant device. The other end of electrical wires 29, 30, 33 and 34 are permanently connected in or coupled to a metallic plate 39, 40, 41 and 42, as illustrated in FIG. 4. Metallic plates 39, 40, 41 and 42 are preferably made of any metal capable and suitable of conducting electricity, preferably copper. As previously mentioned FIG. 4 shows the main internal parts comprised by preferred embodiment 20 and the manner in which such internal parts are preferably distributed. On the other hand, FIG. 5 illustrates a diagram of said main parts or elements. Particularly, preferred embodiment 20 comprises a microcontroller programmed 43; power supply regulator 44; sensor or detecting elements (S1) 45, (S2) 46, (S3) 47 and (S4) 48 and the electromechanical system 49, which comprises servomotor 50 and servomotor arm 52. As illustrated in FIG. 6, servomotor arm 52 comprises metal plates 53, 54, 55 and 56 as well as a spring 57 and screw 58. Metal plates 53, 54, 55 and 56 are preferably made of any suitable conductive metal, preferably copper. Spring 57 and screw 58 functions as fastening means to attach or fast the conducting plates 53, 54, 55 and 56 to servomotor arm 52. Conducting plates 53 and 54 are interconnected by metallic section 60 acting as a bridge, thus forming a pair of plates. In a similar manner, conducting plates 55 and 56 are interconnected by metallic bride or section 62, thus forming a second metallic plate's pair.

Servomotor arm 52 may be positioned or swift by rotation to a diagonal position as illustrated in FIG. 4, wherein the pair of plates 53 and 54 and 55 and 56 are not in direct contact with the plates 39, 40, 41 and 42, which implies that the device is in the off position or mode. Alternatively, arm 52 may be shifted to the position illustrated in FIG. 4 in dashed lines, meaning that plates 39, 40, 41 and 42 are in direct contact with the plate's pairs 53 and 54 and 55 and 56, thus closing any potential electric circuit that includes said plates, and therefore allowing the transferring of charge via said plates.

Figure 7:
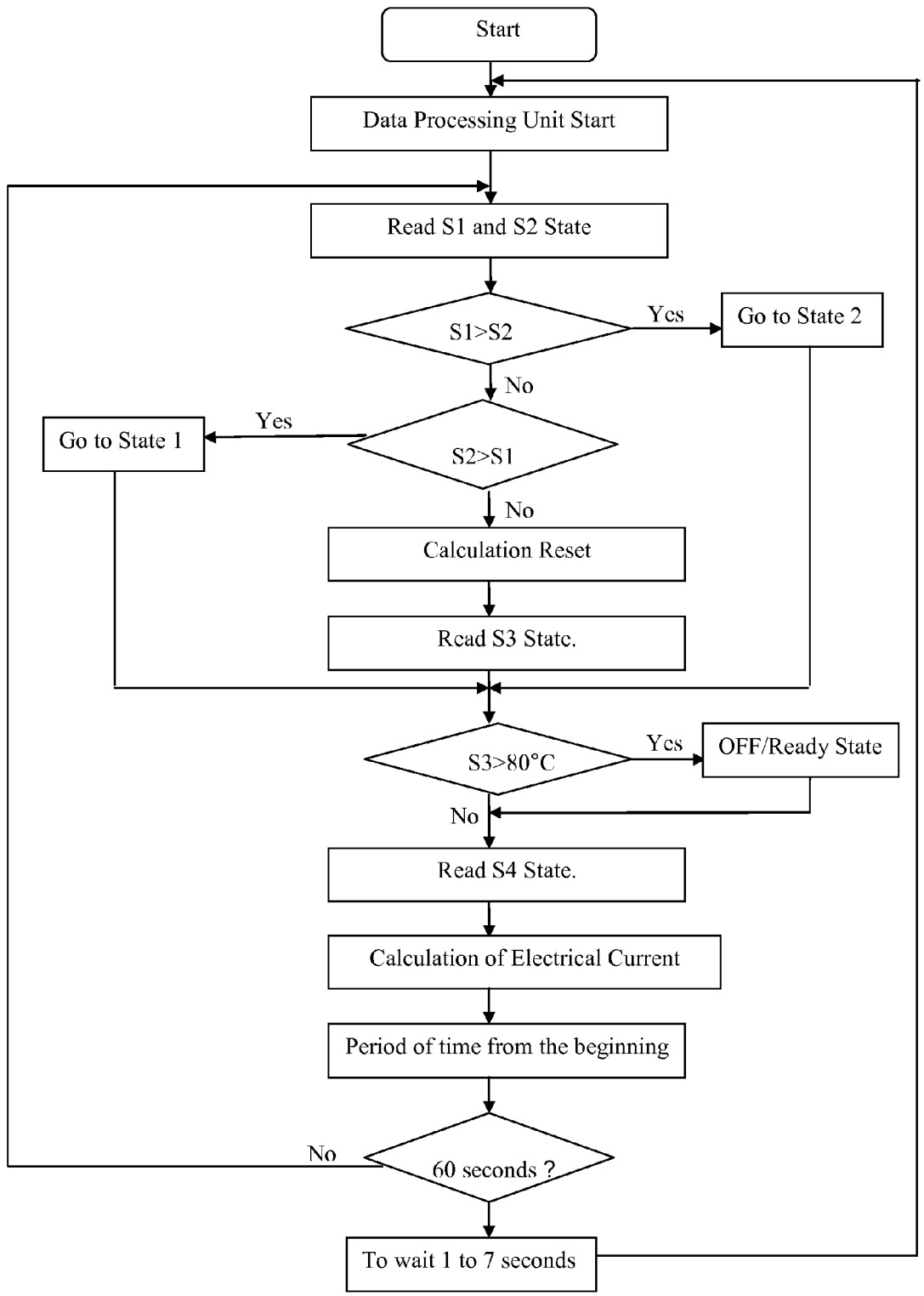
FIG. 7 represents the flowchart of the process commanded by the software in order to control and dictate the operation of the embodiments according to the instant invention, particularly the charging/discharging process.

In reference to the microcontroller 43, it is also known in the art as a minicontroller, i.e. a small computer with "programmable input/output peripheral ports" which is programmed to a software base on chart flow 63 in order to control the functions of the device. FIG. 7 illustrates a block or chart diagram disclosing the main operations executed by software 63 in order to control the activities of the charger 20 that are explained herein. The programmable microcontroller 43 or similar ones used according to the invention are commercially available. Preferred embodiments of the instant invention are EASY STEP 3000 INDUSTRIAL INTERFACE model or similar models.

As illustrated in FIGS. 4 and 5, microcontroller 43 is electrically connected to all the main parts of the device. For example, it is connected to charging port 23, display unit 26, power supply regulator 44; sensor or detecting elements (S1) 45, (S2) 46, (S3) 47 and (S4) 48 and the electromechanical system 49, which comprises servomotor 50 and servomotor arm 52.

Regarding charging port 23, it is a port that receives alternating current (AC) from an external source and converts it into direct current (DC) or a port that receives direct current (DC) and transfers it to the microcontroller 43, thus energizing the charger or device 20 with a voltage of 12 volts or 24 volts. The display unit 26 functions as an interface between the user and the device since it receives and exposes the internal conditions of the device, in a manner that the user may use the device according to the output of such display 26. Similarly, the microcontroller unit 43 is connected to the electromechanical system 49 comprising servomotor 50 and its arm 52 and to the current regulator supply 44. The current regulator supply 44 regulates the 12 volts or 24 volts received from the external source to 5 volts of direct current (DC) that is supply to the electromechanical system 49; therefore it provides a stable voltage of 5 volts of direct current (DC) with which is operated electromechanical system 49. Any suitable and commercially available current regulator supply may be used in the device according the instant invention, for instance it may be a model BUK-100 or a similar one.

As mentioned previously, the device 20 comprises a series of sensors used as means for sensing and detecting various instrumentation variables. It comprises sensor (S1) 45 that senses or detects the position of servomotor arm 52 and transmits said information to microcontroller 43. Sensor (S1) 45 is a limit switch sensor type, preferably of the LS SERIES model or similar one. Similarly, sensor (S2) 46, is a voltage sensor, preferably the type MCR-VDC-UI-B-DC or similar one; which senses and detects the voltage of all batteries connected to the charger and transmits this information to the programmed microcontroller 43. The device also comprises temperature sensor (S3) 47, preferably a thermocouple type J or similar one; which detects temperature of the electrical wires or wiring during the process of charging/discharging or energy transferring and it transmits said information to the microcontroller 43. Similarly, sensor (S4) 48 is a sensor of amperage, preferably of the type DHR 1000 or similar one, which sense and detects the amperage of the battery or batteries being charged and transmits said information to the microcontroller unit 43. Thus, the sensors comprised in the instant invention are commercially available and the respective models wherein mentioned herein may be substituted by similar ones without departing from the scope of the instant invention; and all the information sensed and detected by said sensors is transmitted to the software base on flow chart 63, within the microcontroller 43 and used in order to decide the operation commands of the device 20, particularly the when and where the charge transferring process of the circuit is open or closed by means of controlling the shifting or rotating of the servomotor arm 52.

FIG. 4 illustrates a preferred location of said sensors. For instant, sensor (S1) 45 is located at internal platform 11, sensor (S2) 46 is located at front section of platform 11; sensor (S3) 47 is fastened to the surface of electrical wire 34 by means of a suitable fastening means such as a washer or clip while the sensor (S4) 48 is surrounding the circumference of electrical wire 34.

The present invention also comprises second preferred embodiment for the charger/discharger device 70, which is a dual circuit device. Lateral, front and back views of embodiment 70 are shown respectively in FIGS. 8, 9 and 10.

Figure 8:
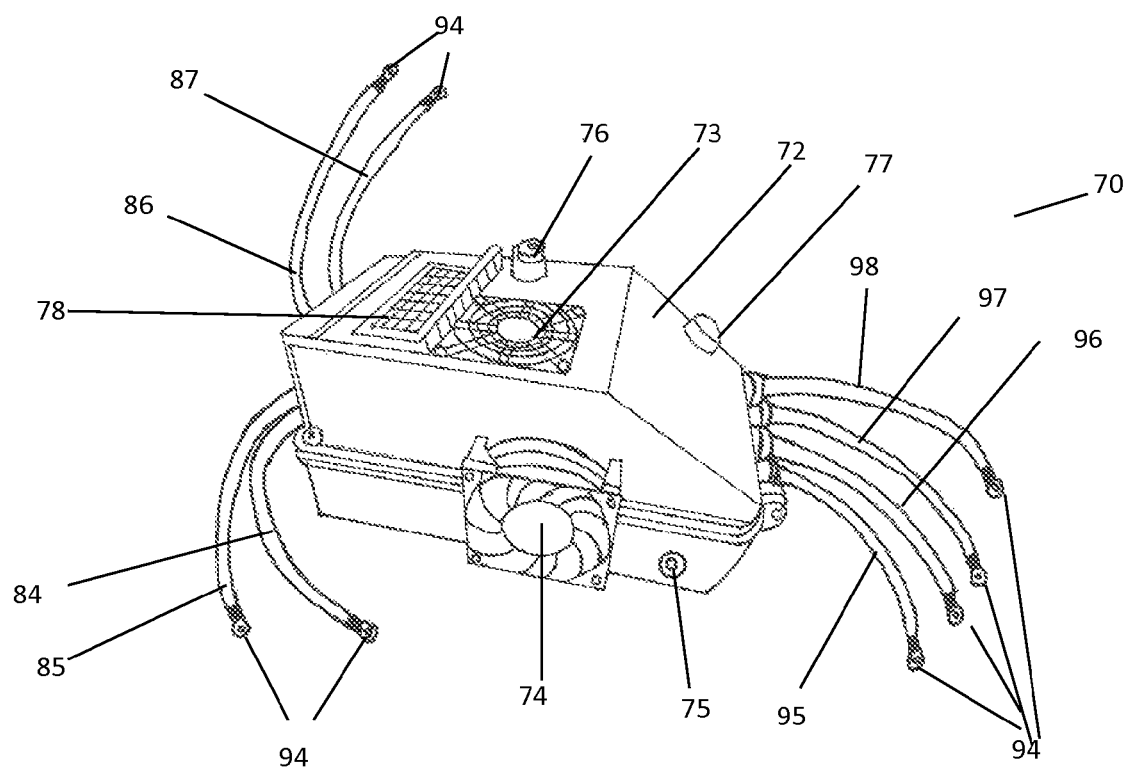
FIGS. 8, 9 and 10 illustrate lateral, front and back views, respectively of a second preferred embodiment according to the instant invention.
Figure 9:
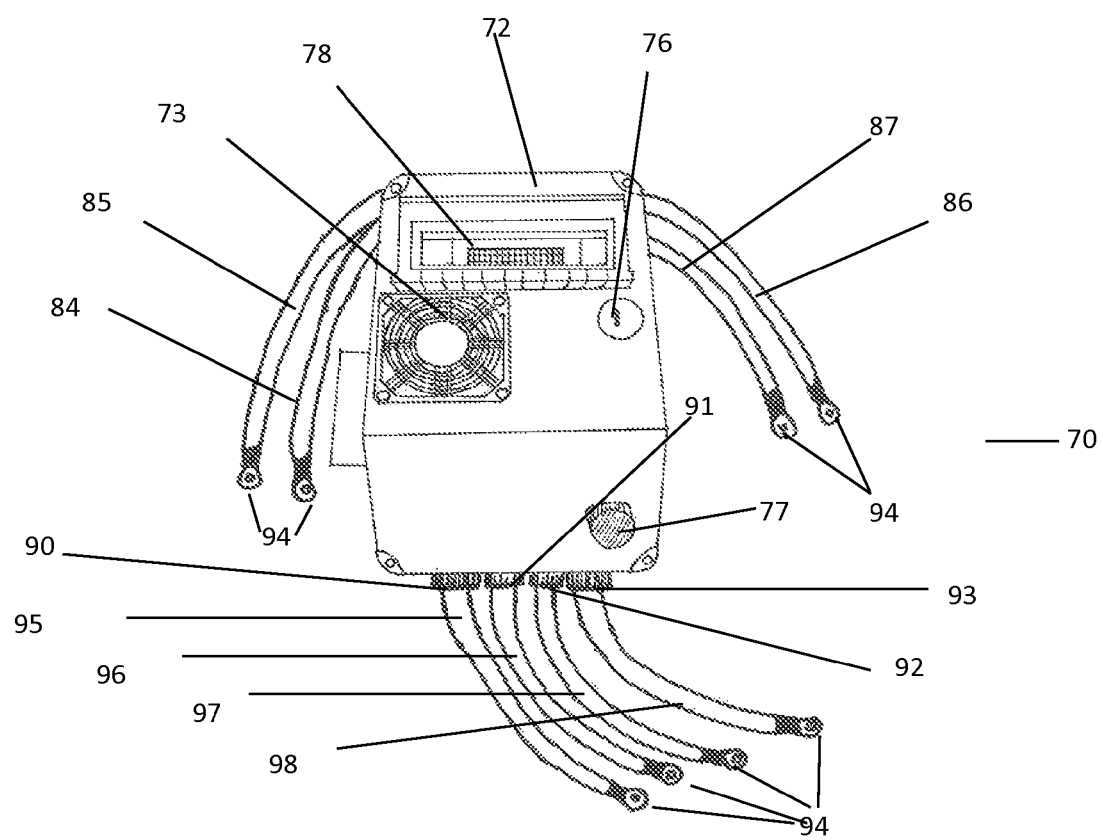
Figure 10:
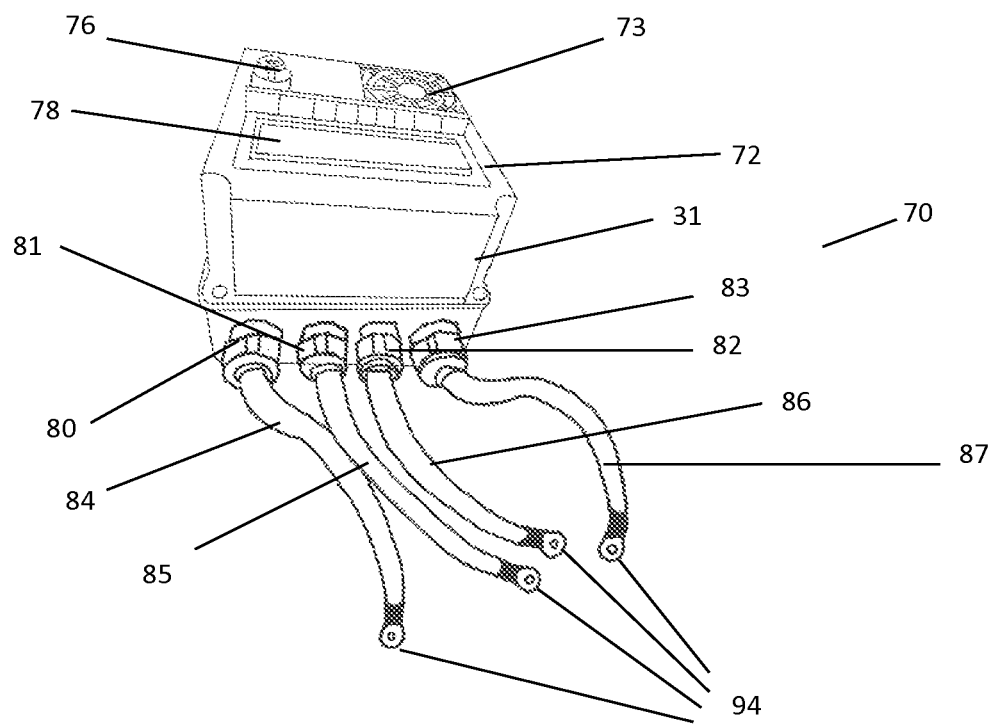

Embodiment 70 comprises the same type of elements already discussed for the first preferred embodiment 20; for example, and as illustrated in FIGS. 8, 9, 10 it comprises: a housing 72; a cooling system comprising fan 73 and exhaust 74; a charging port 75, which is configured for receive charge from an external source, so that the embodiment 70 may be electrically powered; an ignition switch ON/OF 76; a push button 77 and a display unit 78.

On the other hand and contrary to first preferred embodiment 20, the second embodiment 70 comprises, as is illustrated in FIGS. 8, 9, 10 and 11 four holes 80, 81, 82 and 83 in the back section of housing 72, each of said holes providing exit to the exterior to electrical wires 84, 85, 86 and 87; the first two negative and the other two positive. Similarly, case 72 also comprises four holes 90, 91, 92 and 93 on its front section, each one of said holes providing exit to the exterior to electrical wires 95, 96, 97 and 98, the first two positives and second two negatives. Each of the external ends of such electrical wires 84, 85, 86, 87, 95, 96, 97 and 98 comprises a connection unit 94, which is designed to be the point of connection of these wires with the poles or terminals of the batteries to be charged or discharged when using second embodiment 70.

Figure 11:
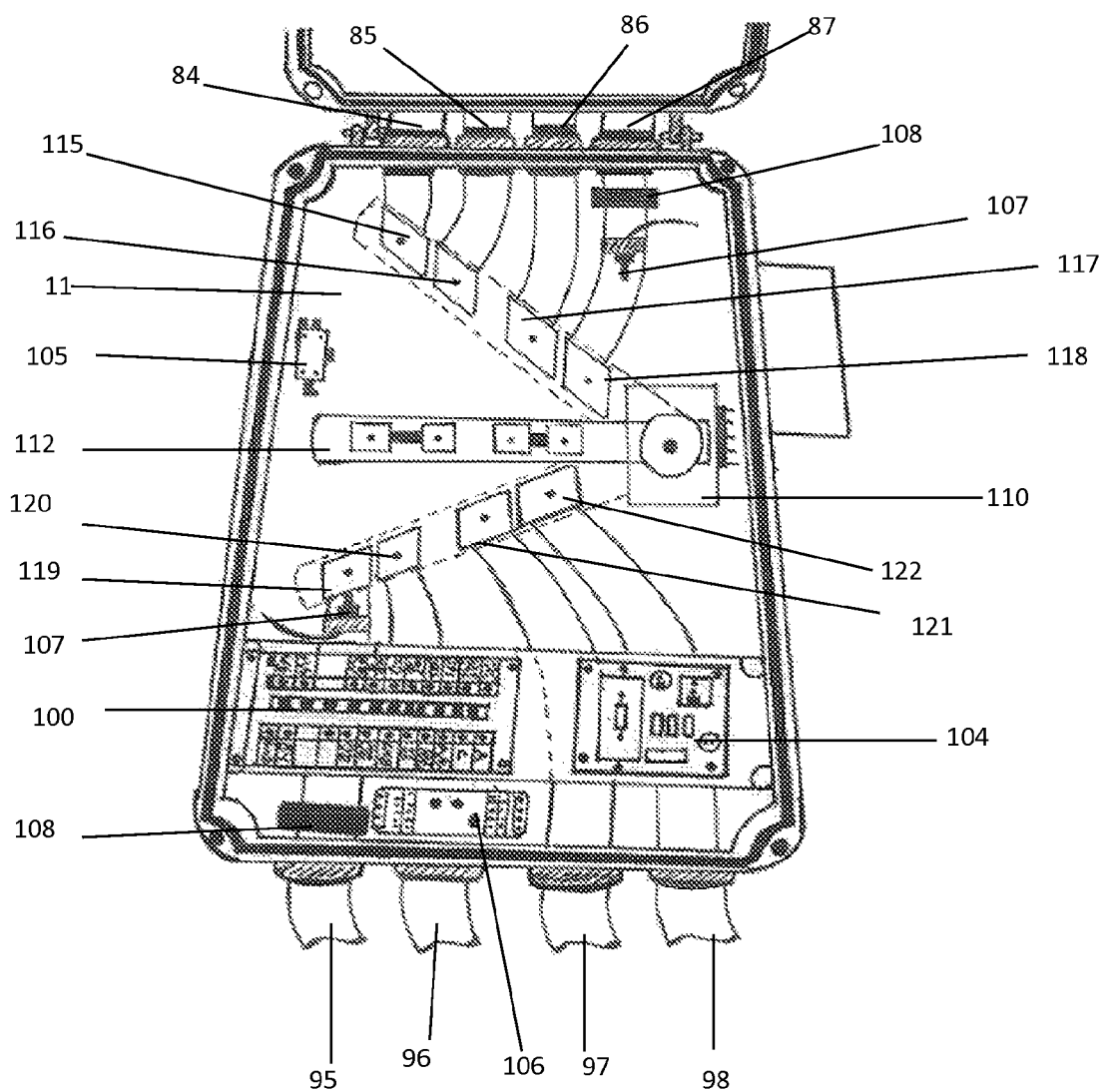
FIG. 11 shows top view of the interior section of the second preferred embodiment according to the invention illustrating its internal parts and the preferred manner in which such internal parts are located in reference to the others and wherein the electrical wires and the top section of the case has been omitted in view of clarity.
Figure 12:
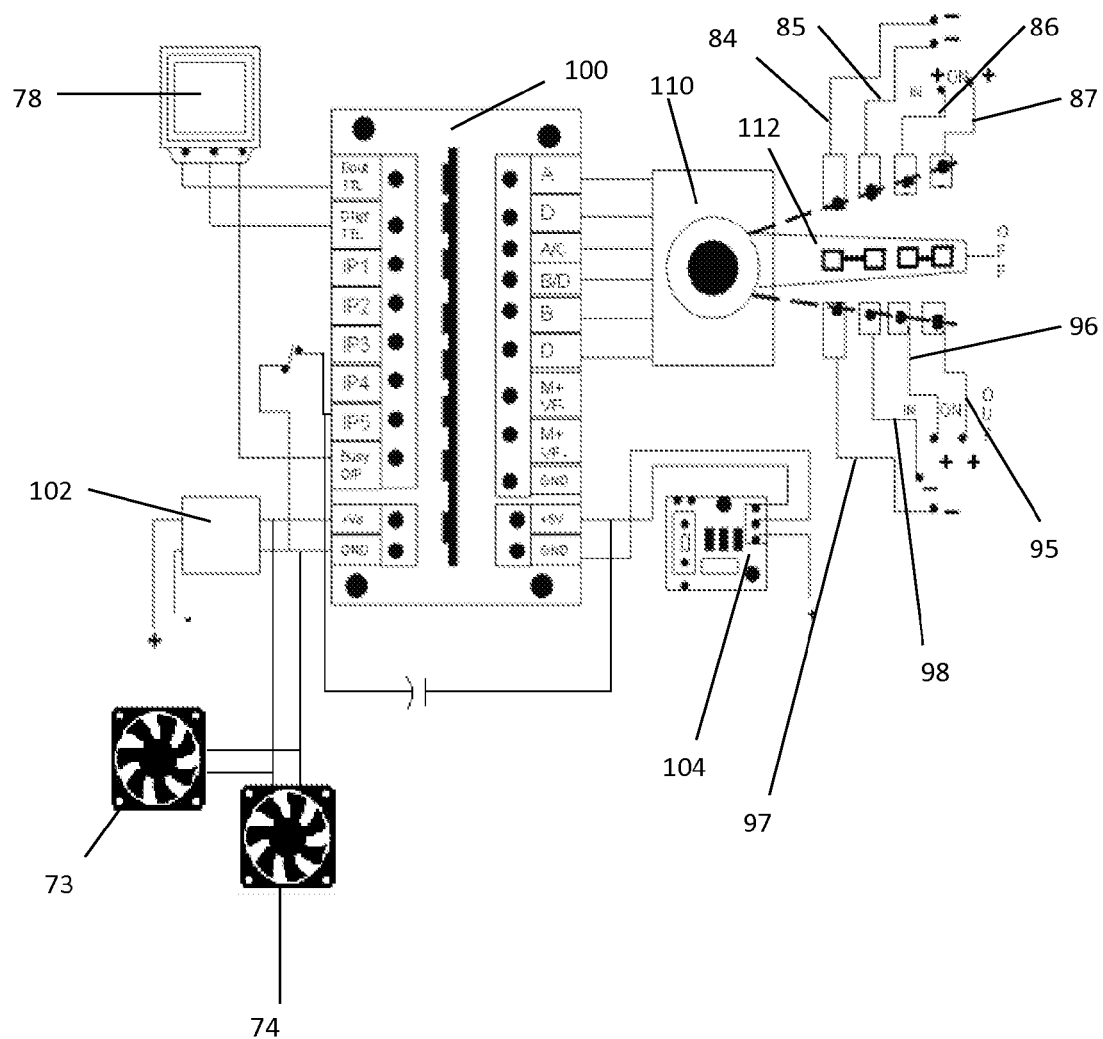
FIG. 12 shows a diagram of the internal parts of the second embodiment according to the invention.

FIG. 11 schematically represents a partial view of the interior of the second embodiment 70 according to the invention, where its internal main parts are illustrated in the preferred distribution or location and wherein the top section of housing 72 and parts of the electrical wires have been omitted for clarity. Meanwhile, FIG. 12 illustrates a diagram of the same internal parts out of the housing 72. As illustrated in FIGS. 11 and 12, the second preferred embodiment 70 comprises a main control unit or programmed microcontroller unit 100 having multiple ports; charging port 102, power supply regulator 104; sensor or detecting means 105, 106, 107 and 108 and an electromechanical system 109, which comprises servomotor 110 and servomotor arm 112. As in embodiment 20 and as illustrated in FIG. 12, microcontroller 100 is electrically connected to charging port 102, which receives 12 volts or 24 volts of direct current (DC) (DC) from an external source and transfer it to the microcontroller 100 thus energizing the device. It is also electrically connected to (1) the display 78, which acts as an interface between the user and the device since it receives and exposes the internal conditions of the charger so can be used according to the output of said display 78; (2) the electromechanical system 109, which comprises servomotor 110 and servomotor arm 112; (3) the sensor or detecting means 105, 106, 107 and 108 and to (4) the power supply regulator 104, which regulates to 5 volts of direct current 12 volts or 24 volts of direct current (DC) supplied to the controller 100 by an external source and therefore provides a stable voltage of 5 volts of direct current (DC) with which is operated electromechanical system 109.

Figure 13A:
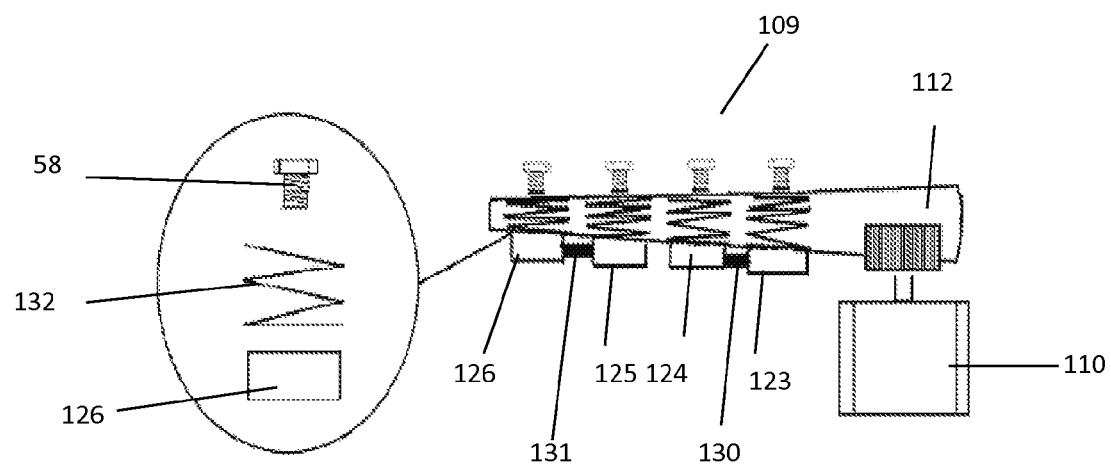
FIG. 13A shows lateral view of the servomotor and its mechanical arm; wherein the external surface of said arm is omitted in order to show internal components of the arm and a detailed view of the components of the servomotor arm.
Figure 13B:
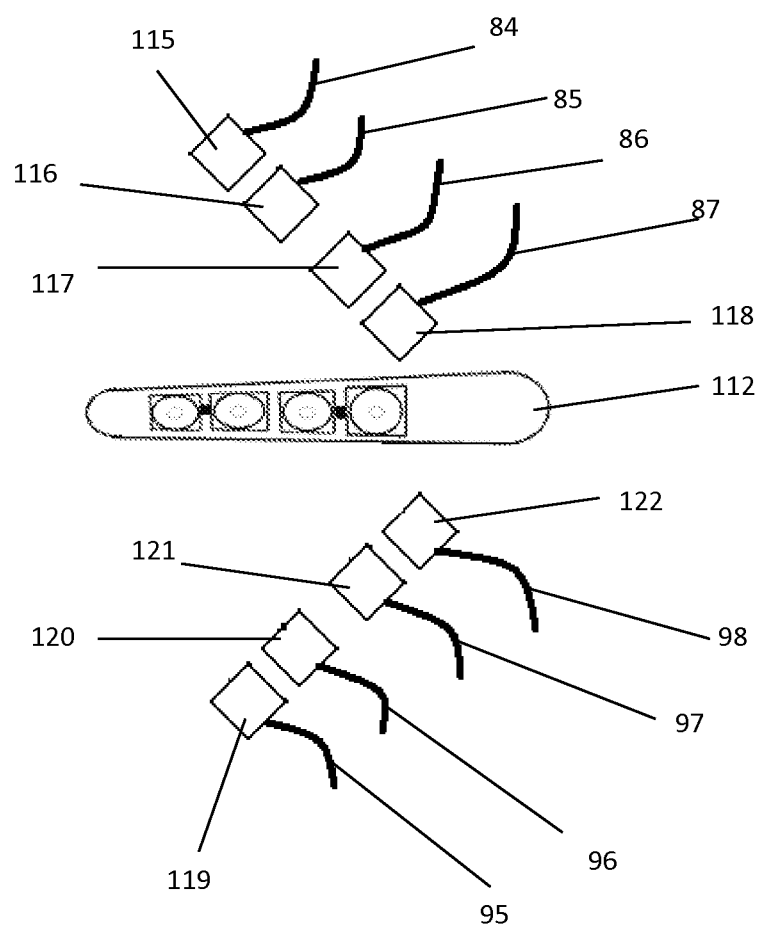
FIG. 13B illustrates a top view of the servomotor arm, showing its two pair of interconnected plates, the internal ends of the electrical wires and its metal plates and the relative position of the plates connecting internal ends of the electrical wires with respect to the plates on the servomotor arm.

As illustrated in FIG. 11, servomotor arm 112 comprises, as discussed in the description of embodiment 20, four metal plates 123, 124, 125 and 126 wherein the first two plates 123 and 124 are interconnected by a metal bridge 130, thus forming a pair of plates. Similarly, plates 125 and 126 are interconnected by metal bridge 131 forming a second pair of plates. Metal plates 123, 124, 125 and 126 and metal bridges 130 and 131 are preferably made of any suitable conductive metal, preferably copper. As illustrated in FIGS. 13A and 13B, servomotor arm 112 comprises spring 132 and fastening means 134 to attach or fast the conducting plates 123, 124, 125 and 126 to servomotor arm 112.

As illustrated in FIGS. 11 and 13C, in second embodiment 70, the internal ends of the electrical wires 84, 85, 86 and 87 at the back section of housing 72 are permanently connected in an aligned position to four aligned metallic plates 115, 116, 117 and 118. Similarly, the ends of the four electric wires 95, 96, 97 and 98 at the front side of the housing 72 are permanently connected in an aligned position to four as aligned metallic plates 119, 120, 121 and 122. Said metallic plates are preferably made of any metal capable and suitable of conducting electricity, preferably copper. At the command of the programmed microcontroller 100, servomotor arm 112 may be positioned or shifted over first set of plates 115, 116, 117 and 118, thus closing an electric circuit once batteries are connected to connecting units 94 of each one of the electrical wires 84, 85, 86 and 87. Similarly, if servomotor arm is shifted to a position wherein servomotor plates 123, 124, 125 and 126 are in direct contact with plates 119, 120, 121 and 122, another electrical circuit is closed once the batteries are connected to connecting units 94 of each one of the electrical wires 95, 96, 97 and 98. Thus, preferred embodiment 70 comprises a two electric circuits that are used in an alternate manner as further explained below in operational terms. As illustrated in FIG. 11, the dual circuit system on embodiment 70 comprise two temperature sensors 107 (S3) located on electrical wires 87 and 95 and two amperage sensors (S4) 108 located on electrical wires 87 and 95. Regarding the sensors (S1) 105, (S2) 106, (S3) 107 and (S4) 108 are the same type of sensors or detecting means already discussed for the embodiment 20. Similarly, the same already discussed cooling system for embodiment 20 is included in embodiment 70.

Figure 14:
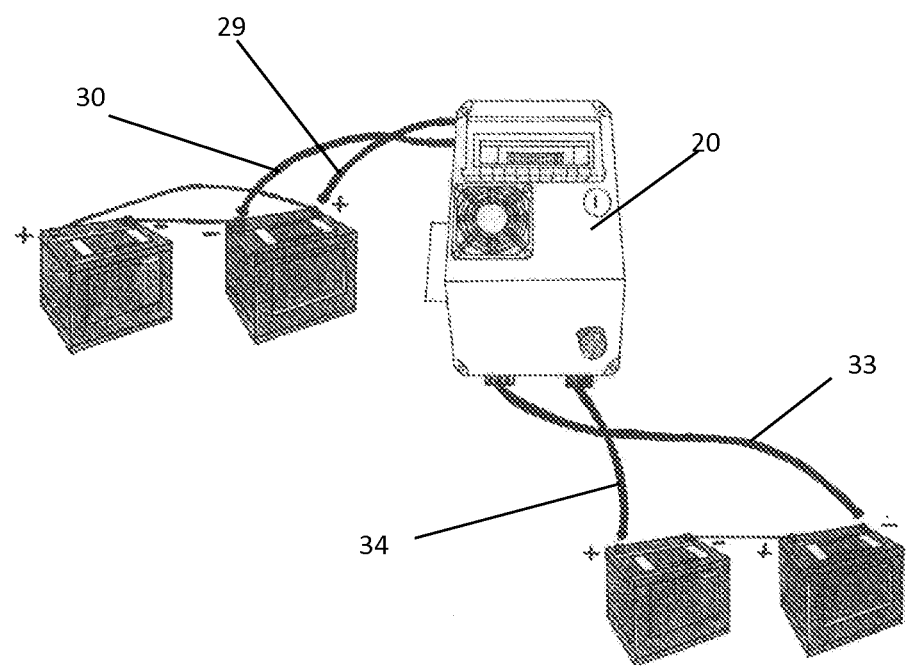
FIG. 14 illustrates the use of the first embodiment according to the invention in a simultaneous charging/discharging process, transferring electric energy (DC/DC) from a set of batteries to another set of batteries accordingly to the charge differential on each set of batteries.
Figure 15:
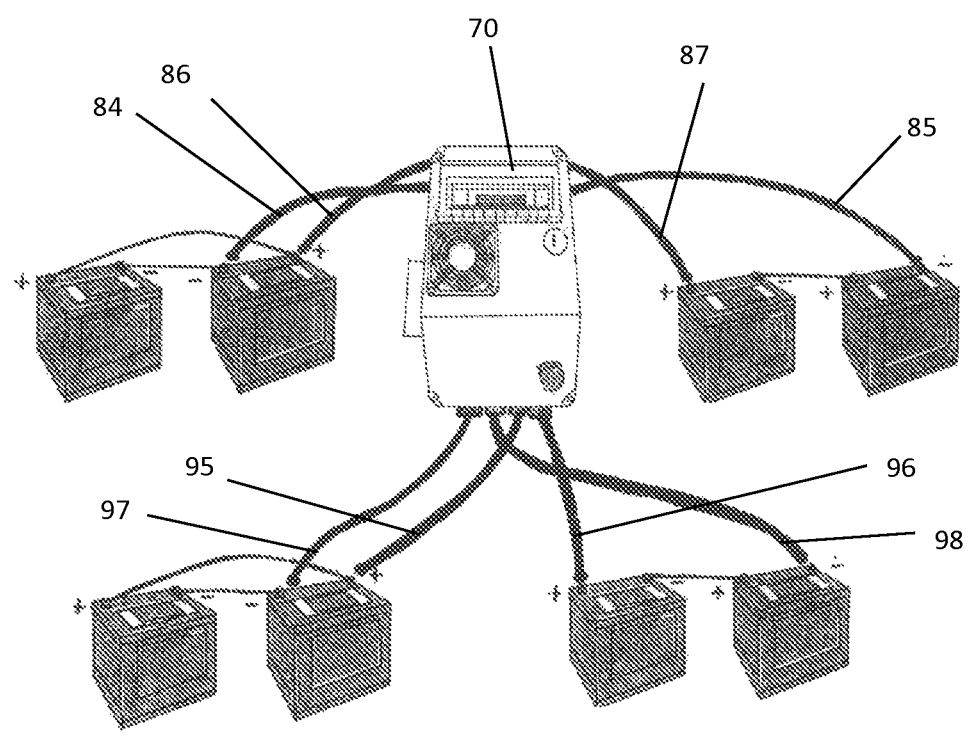
FIG. 15 illustrates the use of the second preferred embodiment according to the invention, connected to four sets of batteries, wherein the charging/discharging process or transferring electric energy (DC/DC) involving a first two sets of batteries is carried out in two alternate and independent processes to a charging/discharging process involving a second two sets of batteries accordingly to the charge differential of each set of batteries.
Figure 16:
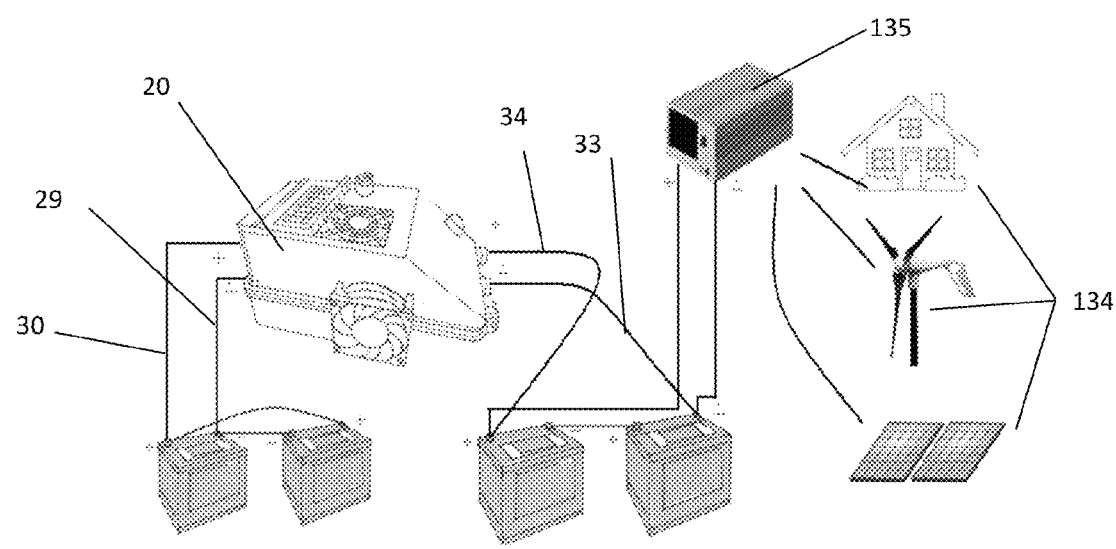
FIG. 16 illustrates the use of the first embodiment according to the invention in a simultaneous charging/discharging process, transferring electric energy (AC/DC) from an external energy source such as an electric outlet or socket of a house, a solar panel or a wind power source to a set of batteries.

FIGS. 14, 15 and 16 illustrate examples of using the preferred embodiments according to the invention described herein in charging/discharging of batteries wherein the transferring of charge from one set of batteries to the other set of batteries is performed based upon the charge differential of said batteries sets.

In FIG. 14, preferred embodiment 20 already connected to two sets of batteries is illustrated. Said two set of batteries are connected to the connecting units 35 of the electrical wires 29, 30, 33 and 34 and charge is transferred from one set of batteries to another set of batteries according to charge differential of such set of batteries. In operational terms, once the set of batteries are connected to the device 20 and the device is electrically connected to an external source via charging port 23, it is energized, programmed microcontroller 100 is activated and received the corresponding detected information from each one of the sensors (S1) 45, (S2) 46, (S3) 47 and (S4) 48, wherein:

sensor (S1) 45 detects the position of the servomotor arm 52;

sensor (S2) 46 detects voltage of batteries connected to the device, thus allowing software to identify the charge differential between them;

sensor (S3) 47 detects this temperature wire 34 and sensor (S4) 48 detects the amperage on batteries receiving charge.

Once the software receives and processes the information from four sensors, the device is activated once the user push button 24, and the energy (current) transferring process or charging/discharging batteries process starts since the servomotor is commanded by the microcontroller 100 to shift its arm 52 over the plates 39, 40, 41 and 42, providing a direct contact with the pair of plates 53/54 and 55/56 located in the servomotor arm 52 thus, closing the circuit created between the sets of batteries and the device via its electrical wires and metallic plates.

The data detected by the sensors (S1) 45, (S2) 46, (S3) 47 and (S4) 48 is continually being provided to programmed microcontroller 100, which may stop the charging/discharging process depending of the detected information or may continue with the charging/discharging process once any of the detected parameters is in the accepted predetermined value. For instance, once the temperature sensor (S3) 47 detected temperature of the wires increases more than a predetermined degrees, the software will order the shifting of the servomotor arm out in order to open the circuit and thus stop the charging/discharging or energy transferring process; thus allowing the batteries to cool off in order to prevent damage to the structural components of the batteries. After a decrease of temperature is detected, the microcontroller 43 shift the servomotor arm over the plates 39, 40, 41 and 42 and thus the energy transferring or charging/discharging process continues. A preferred temperature to stop the charging process used in the instant invention as a temperature borderline is 80 degrees Celsius.

Similar if sensor (S4) 48 detects amperage higher than the one intended to be accumulated in the batteries receiving charge, microcontroller 43 will also command the servomotor arm to shift it position out of contact with plates 39, 40, 41 and 42, thus stopping the energy transferring or charging/discharging process once the voltage of the battery being charged corresponds to the voltage indicated by its manufacturer.

During the device functioning, the information detected by all sensors is monitored, provided and processed by the microcontroller unit 43 and is also provided to and shown in the display 26, in order for the User to manipulate the device according to said data. Thus, the User is able to visualize (1) the voltage present in the batteries, (2) the temperatures of the electrical wires (3) the amperage of the batteries receiving the power supply.

The device in any of its embodiment herein described is able to perform the energy transferring or charging/discharging process in a very fast time of about 10 minutes in order to protect the integrity of the structural components of the batteries and thus its useful life. Microcontroller unit 43 may order periodical and temporary stops at a predetermined time intervals and re-start the energy transferring or charging/discharging process automatically after a predetermined period of time. The preferred time intervals of such automatic start/stop/start cycles fluctuated from 1 to 7 seconds every 60 seconds.

In FIG. 15, preferred embodiment 70 is shown already connected to four sets of batteries, via connecting units 94 of the electrical wires 84, 85, 86, 87 as well as electrical wires 95, 96, 97 and 98. The charging/discharging process using embodiment 70 is dual circuit device, since the energy transferring or charging/discharging process of the sets of batteries connected to the electrical wires 84,85, 86 and 87 according to the charge differential of said batteries is independent from the energy transferring or charging/discharging process of the set of batteries connected to electrical wires 95, 96, 97 and 98. Each independent process works as already described for embodiment 20 as described previously and illustrated in FIG. 14, with the difference that the servomotor arm 112 may be shifted or positioned (1) over plates 115, 116, 117 and 118 thus closing an electric circuit of the sets of batteries connected to the electrical wires 84, 85, 86 and 87; (2) over plates 119, 120, 121 and 122 thus closing an electric circuit comprising the sets of batteries connected to the electrical wires 95, 96, 97 and 98 or (3) over the center position wherein both electrical circuits would remain open and therefore there is no charge transferring, meaning the device is in the off mode.

As previously explained for embodiment 20, the shifting of the servomotor arm 112 is directed and control by the software 63 accordingly to the information provided by the sensors 105, 106, 107 and 108. As explained in the functioning of embodiment 20, embodiment 70 is able to perform the charging/discharging process in a very fast time of about 10 minutes in order to protect the integrity of the structural components of batteries and thus its useful life. Microcontroller 100 order periodical and temporary stops at a predetermined time intervals and re-start the said charging/discharging process automatically, nonetheless while stopping the charging/discharging process in one electrical circuit the servomotor arm 112 is closing the opposite electrical circuits, thus starting a charging/discharging process in said second electrical circuit. Thus, in embodiment 70 both electrical circuits are in a energy transferring or charging/discharging process in an alternate manner in a predetermined time intervals, preferably of 1 to 7 seconds.

FIG. 16 shows the use of the preferred embodiment of the invention, wherein the charging/discharging of batteries is performed but wherein alternate current is provided from a source such as an electric outlet or socket of a house, a solar panel or a wind power generator to a set of batteries in a AC/CD transmitting process. In this case, previous to the entrance to the embodiment 20, alternate current is transform to direct current by means of a rectifier 135. The functioning of the device is exactly to the one previously described.

While the invention has been described in conjunction with some embodiments, it is to be understood that many alternatives, modifications, and variations will be apparent to those skilled in the art in light of the forgoing description. Accordingly, the invention is intended to embrace all such alternatives, modifications and variations falling within the spirit and scope of the appended claims.

What is claimed is:

1. A portable charging device comprising:
(a) a housing having a permanent internal flat supporting area;
(b) a microcontroller programmed for controlling charging functions having multiple peripheral ports;
(c) a charging port electrically connectable to an external energy source in order to electrically power the portable charging device, said charging port being electrically connected to the microcontroller;
(d) a power supply regulator being electrically connected to said microcontroller and able to regulate the electric charge powering the portable charging device received via the charging port;
(e) a servomotor, electrically coupled to said microcontroller and electrically powered from said power supply regulator via said microcontroller;
(f) a rotatory servomotor arm connected to the servomotor and providing an electromechanical system with said servomotor;
(g) a first set of metallic conducting plates, permanently secured in an aligned position on said servomotor arm; wherein each two of said plates that are adjacent are interconnected by a metallic bridge, thus forming independent metallic plate pairs;
(h) a second set of metallic conductive plates aligned and permanently connected to the internal supporting area of the housing;
(i) multiple electric wires, each of said wires having an internal end and an external end in reference to its position regarding the housing;
(j) a battery terminal connector per each one of the multiple electric wires, said battery connector being independently connected to the external end of a given electric wire;
(k) a third set of metallic conductive plates, aligned and permanently connected to the internal supporting area of the housing, each one of said plates being permanently connected to the interior end of one of the electric wires;
(l) a position sensor, electrically connected to the microcontroller that monitors the servomotor arm position by sensing, detecting and communicating the position of the servomotor arm to the microcontroller;
(m) a voltage sensor, electrically connected to the microcontroller, that monitors the voltage of the batteries connected to the portable charging device by sensing, detecting and communicating to the microcontroller the voltage of batteries connected to the portable charging device;
(n) a temperature sensor electrically connected to the microcontroller, that monitors the temperature of the wires connected to the batteries by sensing detecting and communicating to the microcontroller said temperatures;
(o) an amperage sensor electrically connected to the microcontroller, that monitors the amperage of the battery or batteries being charged by sensing, detecting and communicating said amperage to the microcontroller;
(p) a display electrically connected to the microcontroller able to display that receives and displays the internal conditions of the device digitally such as the voltage present in batteries; temperature of electrical wires; amperage of the batteries receiving charge;
(q) interaction switches comprising ignition switch and push switch which are electrically connected to the microcontroller and;
wherein the position or shifting of the servomotor arm is controlled by the microcontroller based upon the following data: (1) position of said mechanical arm, (2) voltage of each one of the batteries connected to the portable charging device, (3) temperature of the electrical wires and (4) amperage of the battery or batteries being charged; data which is constantly received by the microcontroller from the position sensor, the voltage sensor, the temperature sensor and the amperage sensor respectively and;

wherein a electric circuit is closed or completed whenever (1) the servomotor arm is shifted by the microcontroller over said second set of metallic conductive plates and (2) individual battery terminals connectors are connected to batteries terminals;

wherein the portable charging device may be used to transfer electric charge in a direct current to direct current process (DC/DC) or in a alternate current to direct current (AC/DC) energy transfer process and;

wherein for the direct current to direct current (DC/DC) energy transfer process under operational conditions, it is requires at least that (1) the portable charging device be connected to a direct current (DC) external power source via the charging port, (2) the received DC charge be regulated by the power supply regulator to a determined and stable voltage before the charge is transferred to the servomotor and (3) that the portable charging device be connected to a sets of batteries via the batteries terminal connectors in order for the portable charging device automatically transfer the electric charge between the connected batteries according to the charge differential of said batteries and;

wherein for the alternate current/direct current (AC/DC) energy transfer process, under operational conditions, it is required (1) the portable charging device is connected to a set of batteries via the batteries terminal connectors (2) the alternate current (AC) source is electrically connected to a rectifier which is also electrically connected to the portable charging device via one of the sets of batteries; (3) alternate current is converted to direct current by the rectifier previous to entering the portable charging device and (4) charge must be regulated by the power supply regulator previous to entering the servomotor.

2. The portable device as recited in claim 1, wherein during the energy transferring process, the microcontroller orders the servomotor arm to be shifted over the second set of metallic conductive plates on the internal supporting area of the housing once a difference in voltage on the batteries connected to the system is detected, thus allowing the energy transferring process from the battery or batteries having more electrical charge to the battery or batteries having less electrical charge.

3. The portable device as recited in claim 1, wherein in any energy transfer process, the microcontroller orders the servomotor arm to be shifted out of second set of metallic conductive plates on the internal supporting area of the housing once the detected temperature of the electrical wires is over 80 C degrees, thus the energy transferring process is interrupted and the structural components of the batteries are preserved from high temperature damages.

4. The portable device as recited in claim 1, wherein during any energy transferring process, the microcontroller orders the servomotor arm to be shifted out of the second set of metallic conductive plates on the internal supporting area of the housing once the detected amperage of the battery or batteries being charged exceed its capacity, thus the energy transferring process is interrupted and the structural components of the batteries are preserved from overcharging damages.

5. The portable device as recited in claim 1, wherein the microcontroller orders the servomotor arm to be shifted out of the second set of metallic conductive plates on the internal supporting area of the housing at a predetermined cycles of time, thus stopping temporarily the energy transferring process; after which, the microcontroller orders to said arm to return to the position over said the second set of metallic conductive plates on the internal supporting area of the housing at a predetermined cycles of times in order to re-start the energy transferring process and thus allowing the system to cool off in order to preserve the useful lives of the batteries.

6. The portable device as recited in claim 5, wherein said cycles of time to stop the charging discharging process is of 60 seconds.

7. The portable device as recited in claim 5, wherein said cycles of time for starting the charging discharging process is in the range of 1 to 7 seconds.

8. The portable device as recited in claim 1, further comprising a cooling system comprising a fan and an exhaust unit.

9. A dual circuit portable charging device comprising:
(a) a housing having a permanent internal flat supporting area;
(b) a microcontroller programmed for controlling charging functions having multiple peripheral ports;
(c) a charging port electrically connectable to an external energy source in order to electrically power the portable charging device, said charging port being electrically connected to the microcontroller;
(d) a power supply regulator being electrically connected to said microcontroller and able to regulate the electric charge powering the portable charging device received via the charging port;
(e) a servomotor, electrically coupled to said microcontroller unit and electrically powered from said power supply regulator via said microcontroller;
(f) a rotatory servomotor arm connected to the servomotor and providing an electromechanical system with said servomotor;
(g) a first set of metallic conducting plates, permanently secured in an aligned position on said servomotor arm; wherein each two of said plates that are adjacent are interconnected by a metallic bridge, thus forming independent metallic plate pairs;
(h) a first set of multiple electric wires, each of said wires having an internal end and an external end in reference to its position regarding the housing;
(i) a second set of multiple electric wires, each of said wires having an internal end and an external end in reference to its position regarding the housing;
(j) a battery terminal connector per each one of the multiple wires of the first and the second sets of multiple wires, said battery terminal connector being independently connected to the external end of a given electrical wire;
(k) a second set of metallic conductive plates, aligned and permanently connected to the internal supporting area of the housing, each one of said plates being permanently connected to the interior end of one of the electric wires of the first set of electrical wires;
(l) a third set of metallic conductive plates, aligned and permanently connected to the internal supporting area of the housing, each one of said plates being permanently connected to the interior end of one of the electric wires of the second set of electrical wires;
(m) a position sensor, electrically connected to the microcontroller that monitors the servomotor arm position by sensing, detecting and communicating the position of the servomotor arm to the microcontroller;

(n) a voltage sensor, electrically connected to the microcontroller, that monitors the voltage of the batteries connected to the portable charging device by sensing, detecting and communicating to the microcontroller the voltage of batteries connected to the portable charging device;

(o) a first temperature sensor electrically connected to the microcontroller, that monitors the temperature of the first sets of wires connected to the batteries by sensing detecting and communicating to the microcontroller said temperatures;

(p) a second temperature sensor electrically connected to the microcontroller, that monitors the temperature of the second sets of wires connected to the batteries by sensing detecting and communicating to the microcontroller said temperatures;

(q) a first amperage sensor electrically connected to the microcontroller, that monitors the amperage of the battery or batteries being charged using the first set of wires by sensing, detecting and communicating said amperage to the microcontroller;

(r) a second amperage sensor electrically connected to the microcontroller, that monitors the amperage of the battery or batteries being charged using the first set of wires by sensing, detecting and communicating said amperage to the microcontroller;

(s) a display electrically connected to the microcontroller able to display that receives and displays the internal conditions of the device digitally such as the voltage present in batteries; temperature of electrical wires; amperage of the batteries receiving charge;

(t) interaction switches comprising ignition switch and push switch which are electrically connected to the microcontroller and;

wherein the shifting of the servomotor arm is controlled by the microcontroller based upon the following data: (1) position of said mechanical arm, (2) voltage of each one of the batteries connected to the portable charging device, (3) temperatures of the first and second sets of electrical wires and (4) amperages of the battery or batteries being charged using the first and the second sets of wires; data which is constantly received by the microcontroller from the position sensor, the voltage sensor, the first and the second temperature sensors and the first and the second amperage sensors respectively and;

wherein a first electric circuit is closed or completed whenever (1) the servomotor arm is shifted by the microcontroller over said second set of metallic conductive plates and (2) individual battery connectors are connected to batteries terminals; and a second electric circuit is closed or completed whenever (1) the servomotor arm is shifted by the microcontroller over the third set of metallic conductive plates and (2) individual battery connectors are connected to batteries terminals;

wherein the first and the second circuits are used alternatingly in the process of charging batteries;

wherein the portable charging device may be used to transfer electric charge in a direct current to direct current process (DC/DC) or in a alternate current to direct current (AC/DC) energy transfer process and;

wherein for the direct current to direct current (DC/DC) energy transfer process under operational conditions, it requires at least that (1) the portable charging device be connected to a direct current (DC) external power source via the charging port, (2) the received DC charge be regulated by the power supply regulator before the charge is transferred to the servomotor and (3) that the portable charging device be connected to a sets of batteries via the batteries terminal connectors in order for the portable charging device automatically transfer the electric charge between the connected batteries according to the charge differential of said batteries and;

wherein for the alternate current/direct current (AC/DC) energy transfer process, under operational conditions, it is required that: (1) the portable charging device is connected to a set of batteries via the batteries terminal connectors (2) the alternate current (AC) source is electrically connected to a rectifier which is also electrically connected to the portable charging device via one of the sets of batteries; (3) alternate current is converted to direct current by the rectifier previous to entering the portable charging device and (4) charge must be regulated by the power supply regulator previous to entering the servomotor.

10. The portable device as recited in claim 9, wherein the microcontroller orders the servomotor arm to be shifted over the second aligned metallic plates once a difference in voltage on the batteries connected to the first set of electrical wires is detected, thus allowing the transference of electrical charge from the battery or batteries having more electrical charge to the battery or batteries having less electrical charge.

11. The portable device as recited in claim 9, wherein the microcontroller orders the servomotor arm to be positioned over the third aligned metallic plates once a difference in voltage on the batteries connected to the second set of electrical wires is detected, thus allowing the transference of electrical charge from the battery or batteries having more electrical charge to the battery or batteries having less electrical charge.

12. The portable device as recited in claim 9, wherein the microcontroller orders the servomotor arm to be shifted out of any of the sets of aligned metallic plates once the detected temperature of the corresponding set of electrical wires is over 80 C degree, thus energy transferring process is interrupted in said circuit and the servomotor arm is shifted to the other circuit thus allowing the energy transferring process to be alternated between the first and the second circuit.

13. The portable device as recited in claim 9, wherein the microcontroller orders the servomotor arm to be positioned out of any aligned metallic plates once the detected amperage of the battery or batteries being charged exceed its capacity, thus the energy transferring process is interrupted and the servomotor arm is shifted over the other set of aligned metal plates to start the energy transferring process on the other circuit.

14. The portable device as recited in claim 9, wherein the microcontroller orders the servomotor arm to be shifted out of the first set of aligned metallic plates at a predetermined cycles of time, thus stopping temporarily the energy transferring process on the first circuit and starting the energy transferring process on the second circuit for a predetermined amount of time, after which the microcontroller orders to said arm to return to the position over said first aligned metallic plates, thus allowing the alternation of the energy transferring process form the first circuit to the second circuit and vice-versa.

15. The portable device as recited in claim 14, wherein said predetermined amount of time for energy transferring process is 60 seconds per each circuit.

16. The portable device as recited in claim 9, further comprising a cooling system comprising a fan and an exhaust unit.

\* \* \* \* \*